(12) United States Patent
Hörsch et al.

(10) Patent No.: US 10,761,193 B2
(45) Date of Patent: Sep. 1, 2020

(54) OPTOELECTRONIC SENSOR AND METHOD FOR DETECTING AN OBJECT

(71) Applicant: SICK AG, Waldkirch (DE)

(72) Inventors: Ingolf Hörsch, Waldkirch (DE);
Gerhard Merettig, Waldkirch (DE);
Friedhelm Wiethege, Waldkirch (DE);
Angelika Hofmann, Munich (DE)

(73) Assignee: SICK AG, Waldkirch (DE)

( * ) Notice: Subject to any disclaimer, the term of this patent is extended or adjusted under 35 U.S.C. 154(b) by 546 days.

(21) Appl. No.: 15/349,362

(22) Filed: Nov. 11, 2016

(65) Prior Publication Data
US 2017/0139039 A1 May 18, 2017

(30) Foreign Application Priority Data
Nov. 13, 2015 (DE) .......................... 10 2015 119668

(51) Int. Cl.
| | | |
|---|---|---|
| *G01S 7/48* | (2006.01) | |
| *G01S 7/481* | (2006.01) | |
| *G01S 17/48* | (2006.01) | |
| *G01B 11/14* | (2006.01) | |
| *G01S 17/04* | (2020.01) | |
| *G01S 17/08* | (2006.01) | |

(52) U.S. Cl.
CPC ............ *G01S 7/4816* (2013.01); *G01B 11/14* (2013.01); *G01S 17/04* (2020.01); *G01S 17/08* (2013.01); *G01S 17/48* (2013.01)

(58) Field of Classification Search
CPC .... G02B 2003/0093; G02B 3/10; G02B 3/00; F21V 5/048
USPC ................................................ 356/3.01–5.15
See application file for complete search history.

(56) References Cited

U.S. PATENT DOCUMENTS

| | | | | |
|---|---|---|---|---|
| 5,142,416 A | * | 8/1992 | Nakamura ................ | G02B 3/08 359/742 |
| 5,347,137 A | * | 9/1994 | Street .................... | G01S 7/4812 250/216 |
| 6,540,382 B1 | * | 4/2003 | Simon ....................... | F21S 8/00 362/317 |
| 2002/0074482 A1 | * | 6/2002 | Nakanishi ................ | G01D 5/34 250/214.1 |
| 2008/0007711 A1 | | 1/2008 | Liu | |

(Continued)

FOREIGN PATENT DOCUMENTS

| | | |
|---|---|---|
| CN | 102313882 A | 1/2012 |
| DE | 3702691 A1 | 12/1987 |

(Continued)

*Primary Examiner* — Luke D Ratcliffe
(74) *Attorney, Agent, or Firm* — Nath, Goldberg & Meyer; Jared L. Meyer (57) ABSTRACT

An optoelectronic sensor (10) according to the principle of triangulation for detecting an object (36) in a monitoring region (18) comprises a light transmitter (12) and a spatially resolving light receiver (26). A receiving optics (22) and an optical element (24) are arranged in front of the light receiver (26), wherein the optical element (24) comprises a converging partial region (24*a*) and a diverging partial region (24*c*) and is arranged such that a remitted light bundle (20) from an object (36) in a near range of the monitoring region (18) passes through the converging partial region (24) and a remitted light bundle (20) from an object (36) in a far range of the monitoring region (18) passes through the diverging partial region (24*c*).

18 Claims, 6 Drawing Sheets

(56) References Cited

U.S. PATENT DOCUMENTS

| | | | | |
|---|---|---|---|---|
| 2008/0266544 A1* | 10/2008 | Wolf | ............ | G01S 17/36 |
| | | | | 356/5.01 |
| 2010/0079750 A1* | 4/2010 | Koehler | ............ | G02B 23/10 |
| | | | | 356/251 |
| 2013/0215409 A1* | 8/2013 | Wiethege | ............ | G01C 3/08 |
| | | | | 356/3.01 |
| 2014/0078514 A1* | 3/2014 | Zhu | ............ | G01B 11/24 |
| | | | | 356/606 |
| 2018/0180472 A1* | 6/2018 | Clemens | ............ | G01S 7/4863 |

FOREIGN PATENT DOCUMENTS

| | | |
|---|---|---|
| DE | 19721105 C2 | 5/1997 |
| DE | 19962701 A1 | 6/2001 |
| DE | 102008014912 A1 | 9/2009 |
| DE | 10220037 C5 | 2/2011 |
| DE | 102010038186 A1 | 4/2012 |
| DE | 202013102370 U1 | 10/2013 |
| JP | 2008033245 A | 2/2008 |
| WO | 2013/013349 A1 | 1/2013 |
| WO | 2013013488 A1 | 1/2013 |

\* cited by examiner

OPTOELECTRONIC SENSOR AND METHOD FOR DETECTING AN OBJECT

FIELD

The invention relates to an optoelectronic sensor and a method for detecting an object according to the principle of triangulation.

BACKGROUND

The principle of optical triangulation is based on arranging a light transmitter and a spatially resolving light receiver mutually offset by a known basic distance. Transmission and reception light beam are then oriented at an angle to one another, which causes the reception light spot to move on the receiver in dependence on the distance to the detected object. The position of the reception light spot on the spatially resolving light receiver thus is a measure of the object distance.

There are not only measuring triangulation sensors, which determine and output a distance in the described manner, but also switching systems according to the triangulation principle whose switching behavior depends on the object distance. These sensors include background suppressing sensors. They are switching sensors, thus their output is only a binary object detection signal. At the same time, however, the construction of a triangulation sensor is utilized in order to generate two reception signals with a light receiver which is at least spatially resolving in a near and a far range. Their difference is evaluated with a switching threshold so as to limit the object detection to a certain distance range and to suppress reception signals outside this distance range as a background signal. A background suppressing sensor is for example disclosed in DE 197 21 105 C2, wherein switches are provided in order to assign the individual elements of a spatially resolving light receiver to the near or far range in a variable manner. DE 199 62 701 A1 describes a background suppressing sensor with a virtual separation element.

The relation between object distance and offset of the reception light spot on the light receiver is non-linear. Distance variations in the near range lead to large offsets of the reception light spot and only small offsets in the long range. At the same time, the reception light spot is not an ideal mathematical point and its extent also again depends on the object distance since the receiving optics cannot sharply image the entire distance range. These effects lead to measurement inaccuracies and, in the case of background suppressing sensors, to a switching point deviation and thus at least sometimes to faulty switching.

These problems are particularly serious with glossy objects, because the receiver pupil may then only be partially illuminated. There are sensors which are specifically configured for the detection of gloss. However, their goal is to detect the glossy object at all, or to determine its degree of gloss. A triangulating distance determination or background suppression is not provided and would not be solved by the means specifically introduced for the detection of gloss.

There are approaches in the prior art to improve the receiving optics in order to improve the linearity or to expand the measuring range for particularly near objects. For example, DE 102 20 037 C5 uses an additional near range lens which refracts the reception light the more towards the light transmitter the closer the object is. However, this only improves the behavior in the near range.

DE 10 2008 014 912 A1 arranges an additional correction lens between the receiver lens and the light receiver. As a result, the light beam focused by the receiver lens is selectively deflected in such a way that there is a greater spacing between the incident light beams on the light receiver and a sharp image. However, this is actually impossible with a correction lens affecting the entire reception beam path, but at most a partial improvement for a certain distance range is achieved.

Apart from triangulation, optical distance measurement is also possible in coaxial systems, for example by measuring the light time of flight. For the reception optics to deal with different distances, so-called multi-zone lenses are used, where concentric rings are responsible for certain distance ranges, as for example proposed in U.S. Pat. No. 5,347,137. Such a multi-zone lens with its symmetry is not useful in a triangulation sensor. Any gain in the near range would cause corresponding errors in the far range and vice versa.

The conventional solutions do not at all contribute to the aspect of partial illumination in the case of glossy objects.

SUMMARY

It is therefore an object of the invention to improve the accuracy of the optical triangulation.

This object is satisfied by an optoelectronic sensor according to the principle of triangulation for detecting an object in a monitoring region, the sensor comprising a light transmitter for transmitting a light bundle and a spatially resolving light receiver offset from the light transmitter by a base distance for receiving the remitted light bundle remitted by the object, wherein a receiving optics and an optical element are arranged in front of the light receiver, wherein the optical element comprises a converging partial region and a diverging partial region and is arranged such that a remitted light bundle from an object in a near range of the monitoring region passes through the converging partial region and a remitted light bundle from an object in a far range of the monitoring region passes through the diverging partial region.

The object is also satisfied by a method for detecting an object in a monitoring region according to the principle of triangulation, wherein a light bundle is transmitted and a receiving position of the light bundle remitted from the object is determined, wherein the remitted light bundle is focused by a receiving optics and then additionally beam-shaped in an optical element, wherein a light bundle remitted by an object in a near range of the monitoring region is beam-shaped in a converging partial region of the optical element and a light bundle remitted by an object in a far range of the monitored region is beam-shaped in a diverging partial region of the optical element.

As is usual for optical triangulation, a light bundle is transmitted into the monitoring region, and the remitted light bundle remitted by an object is registered in a light receiver. The remitted light bundle can result from both diffuse remission and directed reflection. Light transmitter and light receiver are arranged offset to one another at a base distance. Because of this triangulation base, the position of the reception light spot which the remitted light beam generates on the light receiver is dependent on the distance of the object, which is also referred to as scanning distance, and therefore the object distance can be triangulated.

The invention starts from the basic idea of optimizing an optical element arranged in the convergent beam plane, i.e. where the remitted light bundle is already convergent due to the effect of the receiving optics, both for the near range and the far range. To this end, the optical element has a converging partial region and a diverging partial region and is arranged in such a way that a remitted light beam from the near range passes through the converging partial region and a remitted light beam from the far range passes through the diverging partial region. The receiving optics itself can only sharply image in a certain scanning distance range. Because of the different effect of the optical element in the near range and the far range, there is in each case a linearization and a sharper imaging of the reception light spot. Moreover, the optical element causes an effective concentration and mixing, respectively, of partial pupil bundles and thus a more homogeneous light distribution within the reception light spot, in particular in the case of glossy objects.

The invention thus has the advantage that due to the improved optical system in the receiving path the light spot position is more clearly defined and can thus be determined more precisely. In switching systems, such as background suppressing sensors, this leads to a more precise switching point and prevents faulty switching. Furthermore, glossy objects are also reliably detected even though the light beam reflected by these objects may only illuminate a partial pupil of the entire receiver pupil.

In the following, it is sometimes easier to refer to a coordinate system in which, without any restriction of generality, the Y-axis connects light transmitter and light receiver, thus indicating the direction in which the receiving light spot moves on the light receiver, the Z-axis is the optical axis of the light transmitter and thus the object distance is measured along the Z axis, and the X-axis is the remaining third axis perpendicular to the Y-axis and the Z-axis.

The optical element preferably comprises a neutral partial region between the converging partial region and the diverging partial region. Throughout this specification, the terms preferably or preferred refer to advantageous, but optional features. The receiving optics itself is focused on the light receiver for an intermediate object distance between near range and far range. In this intermediate range, no additional beam shaping is required. The neutral partial region provides a continuous transition between the converging partial region and the diverging partial region, which can also simplify the manufacturing and arrangement of the optical element.

The optical element preferably comprises a free-form surface with the converging partial region and the diverging partial region. The optical element can be based on refraction and is then referred to simply as a lens, although the effect is different than in a conventional converging or diverging lens. By means of the free-form surface, the beam shaping effects can be adapted locally, in particular to meet the different requirements in the near range and far range. In the case of a lens, the entrance and/or exit surface can be free-form surfaces, or one of the two surfaces remains planar or at least significantly less complex or pronounced in its geometry. Instead of a lens, a reflexive element, i.e. a mirror with a corresponding free-form surface, can also be used. An alternative to a geometric shaping of the optical element is a diffractive element which is designed with the desired diffraction effects.

The free-form surface preferably has at least one of local curvatures or local gradients of curvature and thus at least one of concentrates or mixes partial pupil bundles of the remitted light bundle. The free form can thus be designed for a paraxial focusing by local curvature and for a mixing of the partial bundles by local gradients of the curvature.

A partial pupil bundle is a partial bundle which illuminates only a part of the entrance pupil. For the purposes of explanation, a paraxial partial bundle is considered as a minimal partial bundle, infinitesimal around the optical axis of the incident light. It is focused by the combination of the local curvatures on both sides of the free-form. It is thus possible to select the local convex and local concave curvatures, respectively, of the free-form so that there results a focusing on a common focal plane in the plane of the light receiver. In this context, focusing is to be understood as generally meaning a common focal plane, which may also imply an increase of the focal length.

The intermixing takes place because the partial bundles are not paraxial due to their finite extent, but instead transmit regions of the free-form having different local curvatures, which regions however are designed only for the focusing of a paraxial partial bundle. Therefore, these real, non-paraxial partial bundles are somewhat less focused and consequently widened when passing through the free-form. Due to the local curvature gradients, there are different widening and locations of impact in dependence on the different transition regions of the free-form. This is why the partial bundles intermix. A local curvature gradient is visible on the free-form. For example, a wave of a convex and concave shape has a local curvature gradient on the outer surface, whereas two adjacent cylinders have a constant local curvature.

As usual in modern computer-assisted optics design, the free-form resulting from optimization methods often cannot be described geometrically in simple terms. The shapes are too complex, and different optimizations results having at least nearly the same effect can significantly vary in their geometry. The beam-shaping effect to be achieved in the Y-direction, i.e. along the base distance on the connecting line of the light transmitter and the light receiver, and in the X-direction perpendicular thereto is generally different and can be adjusted almost independently by respective curvatures or curvature gradients in these two directions perpendicular to the beam direction. The triangulation effect, in a first approximation, occurs only along the Y-direction, which of course has an impact on the free-form surface to be optimized.

The optical element preferably has the basic shape of a single wave in a section along the base distance. The wave extends along the base distance, i.e. in the Y-direction, and comprises or consists of a concave arc and a convex arc. This results in a converging and diverging partial region, where the curvature for a refractive optical element and a reflexive optical element is, of course, complementary. The term basic shape means here and in the following that deviations for an additional optimization are conceivable, but that the starting point, in this instance a wave, is still clearly recognizable.

The optical element preferably has the basic shape of a body transversely extruded from the wave. The shape of a wave initially arises from a two-dimensional consideration. By extrusion in the direction transvers to the wave, a three-dimensional body of the lens or mirror is formed, which has the shape of the wave in every section.

The optical element preferably comprises an additional converging curvature transverse to the wave. A pure extrusion body would be flat in the X-direction. However, the shaping of the free-form surface in this direction can contribute to further improvement. A converging effect makes a smaller reception light spot, thus providing a higher energy density. This effect in the X-direction, in contrast to the wave in the Y-direction, exists in both the near range and the far range. Nevertheless, the curvature in the near range and the far range can preferably be designed differently. In particular, there can be a rather small curvature in the diverging partial region or concave far range, and a rather large curvature in the converging partial region or convex near range.

The free-form surface is preferably further optimized from the basic shape in order to take oblique incident light bundles into account. The previous considerations were limited to the X-axis and the Y-axis. This does not take into account the spatial effects, since there are, of course, also light components incident obliquely to the axes. Finer adaptations of the free-form surface starting from the basic shape can contribute that such oblique light bundles do not impair the desired beam shaping.

The optical element preferably causes an additional prismatic tilting of the remitted light beam. This can be achieved by shaping and/or tilted arrangement of the optical element. The prismatic tilting is preferably dependent on the point of incidence of the remitted light beam, i.e. differently pronounced depending on the object distance. Thus the prismatic tilting can in particular contribute to the linearization of the triangulation.

The optical element is preferably trimmed into a rectangular or trapezoidal frame. The optical element thus forms a rectangle or trapezium in a top view and is therefore roughly a parallelepipedal shape, neglecting the free-form surface on the front and/or rear side where the remitted light bundle transmits the optical element. The trimming thus causes almost no optical losses, while the handling, accommodation and mounting are considerably easier.

The diverging partial region preferably has attenuating properties for the remitted light bundle. This can be achieved for example by roughening, coating, mirroring or absorption on the surface or in the material of the optical element. Typically, too much energy is received in the near range. Attenuation in the optical element can thus reduce the dynamical range of the light receiver without impairing the detection properties in the near range.

The optical element is preferably also configured as an optical filter. Again, this can in particular be achieved by coating or by the material, but an optical filter does not merely refer to attenuation, and the effect preferably relates to the entire received light and not only the near range. Examples are an optical band pass effect matched to the wavelength of the light transmitter, a polarization filter, or generally diffractive-optical properties.

The sensor preferably is configured as a background suppressing sensor, wherein the light receiver comprises a near region and a far region with a separating element therebetween, and has a switching output whose switching state depends on whether an object is detected in the near range.

The functional principle of a background suppressing sensor has already briefly been explained in the introduction. It depends on the position of the separating element which signals are suppressed as background. Therefore, for a precise detection, as large a quantity of light as possible should be shifted over the separating element upon distance variation of an object in a distance corresponding to the position of the separating element. This is achieved by the optical element according to the invention. The separating element may be the physical separation line between a near reception element and a far reception element. The separating element also may be virtual and electronically adjustable by connecting individual light receiving elements to the near element and the far element in a simple or weighted combination. By means of such weights, shifting of the separation element is even possible with sub-pixel resolution.

The inventive method can be modified in a similar manner and shows similar advantages. Further advantageous features are described in the sub claims following the independent claims in an exemplary, but non-limiting manner.

BRIEF DESCRIPTION OF THE DRAWINGS

The invention will be explained in the following also with respect to further advantages and features with reference to exemplary embodiments and the enclosed drawing. The Figures of the drawing show in:

FIG. 4b a schematic representation of the reception light spot on the light receiver in the situation of FIG. 4a;

DETAILED DESCRIPTION

Figure 1:
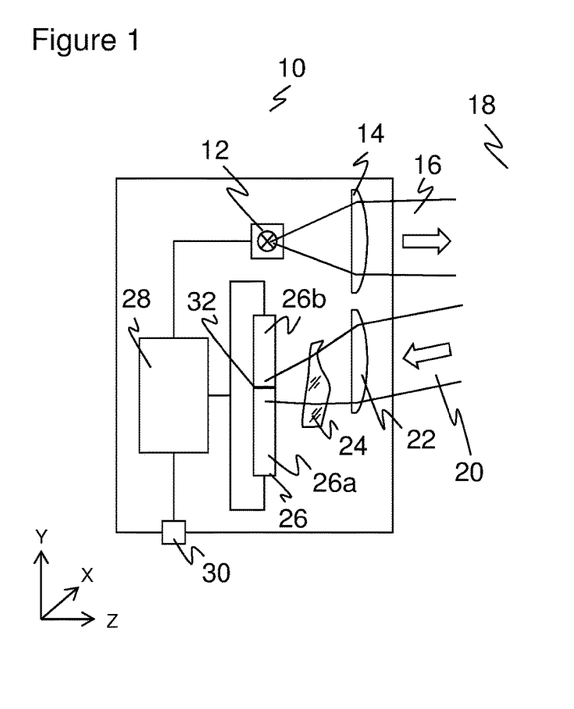
FIG. 1 a block diagram of an optoelectronic sensor according to the triangulation principle.

FIG. 1 shows a schematic sectional view of an optoelectronic sensor 10 according to the triangulation principle in an embodiment as a background suppressing sensor. A light transmitter 12 transmits, through beam-forming transmission optics 14, a light bundle 16 into a monitoring region 18. If the light bundle 16 falls on an object in the monitoring region 18, a part of it returns to the sensor 10 as a remitted light bundle 20.

A receiving optics 22 focuses the remitted light bundle 20. Subsequently, the remitted light bundle 20 is further beam-shaped in an optical element 24 and then impinges onto a light receiver 26, which generates an electrical reception signal. In the embodiment of the sensor 10 as shown, background suppression is provided. The light receiver 26 is therefore divided into a near range element 26a and a far range element 26b. The point of incidence of the remitted light bundle 20 or of the reception light spot it generates on the light receiver 26 depends on the distance of the object being detected, where the remitted light bundle 26 is remitted, due to the triangulation arrangement in the sensor 10. The offset in a direction between light transmitter 12 and light receiver 26 denoted as the Y-axis forms a triangulation base. The effect in particular is that the reception light spot from a far object, i.e. with a large distance along a direction denoted as Z-axis, is detected on the far range element 26b, and the reception light spot from a near object is detected on the near range element 26a.

An evaluation unit 28 is connected to the light receiver 26 in order to determine an object detection signal from the electrical reception signal which is output at a switching output 30, depending on the presence of an object in the near range. For background suppression, the evaluation unit 28 forms the difference between the signal of the near range element 26a and the far range element 26b and evaluates this difference with a threshold. Accordingly, a switching signal is generated at the switching output 30 which indicates object detection when an object is detected in the near range and no object detection when no object or only an object in the far range to be suppressed is detected. The evaluation unit 28 also controls the light transmitter 12.

Instead of a two-element light receiver 26, a PSD (position-sensitive device) or a line of reception elements or pixels can be used. The pixels may have a different width in order to partly compensate for the non-linear dependence of the offset of the light spot on the light receiver 26 from the distance of the object. For the background suppression, a separating element 32 is defined at the factory, by parameterization, or by teach-in, which divides the pixels into two groups and thus the light receiver 26 into the near range element 26a and the far range element 26b. The position of the separating element 32 may be electronically adjustable.

The spatial resolution of the light receiver 26 need not necessarily be used only for a division into a near range and a far range. On the one hand, additional separating elements and distance ranges are conceivable. Moreover, the triangulation may be used for a distance measurement instead of background suppression, so that the sensor 10 is a distance-measuring triangulation sensor.

These are only some aspects in which the construction of the sensor 10 according to FIG. 1 can be modified. The invention relates primarily to the optical element 24, the characteristics of which are explained in more detail below. Other characteristics of a sensor 10 according to the principle of triangulation can be varied in a manner known per se. In this regard of the general function principle and possible modifications of the construction of the sensor 10, reference is for example made to DE 197 21 105 C2 or DE 199 62 701 A1 mentioned in the introduction.

Figure 2:
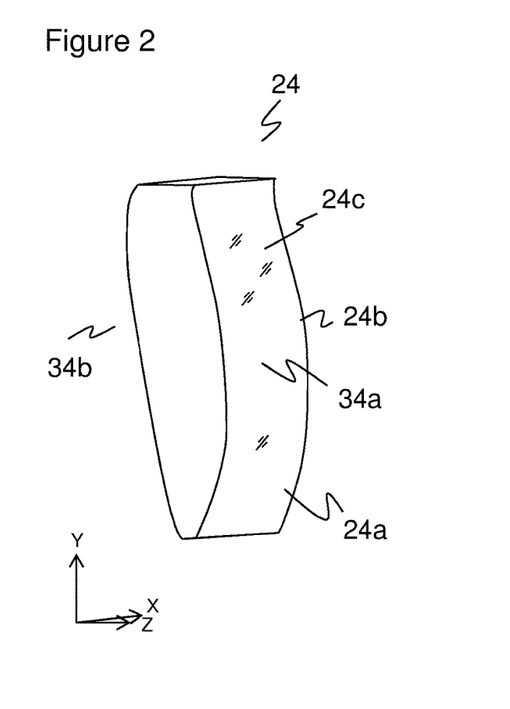
FIG. 2 a three-dimensional view of an optical element for arrangement between transmission optics and light receiver.
Figure 3:
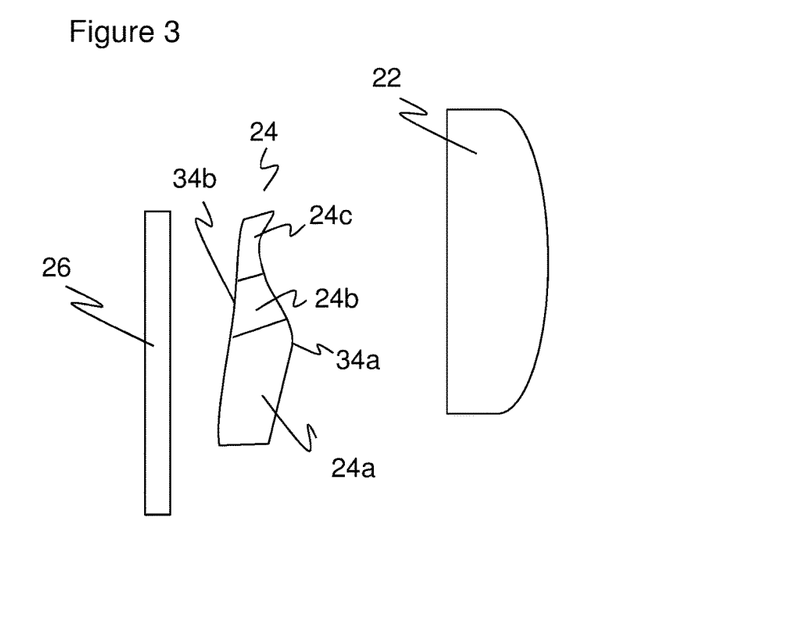
FIG. 3 an enlarged detailed view of the arrangement of the optical element between transmission optics and light receiver.
Figure 4A:
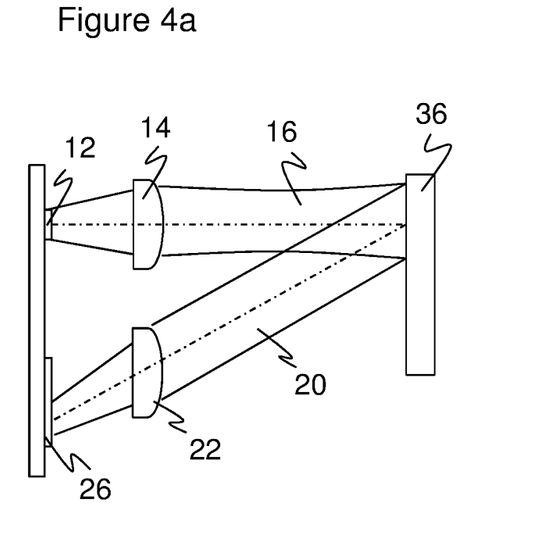
FIG. 4a an exemplary beam path in a conventional triangulation sensor with an object in the near range.
Figure 4B:
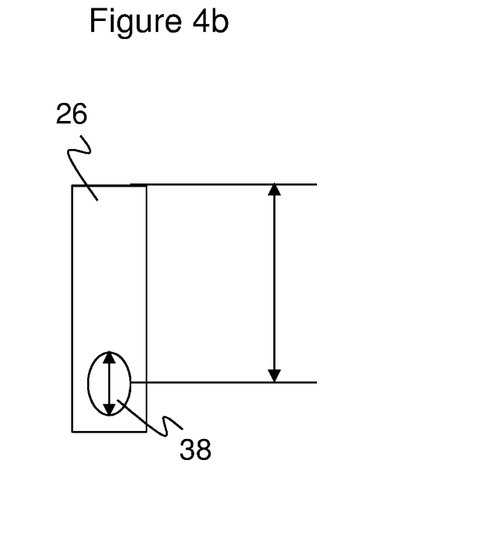
Figure 4C:
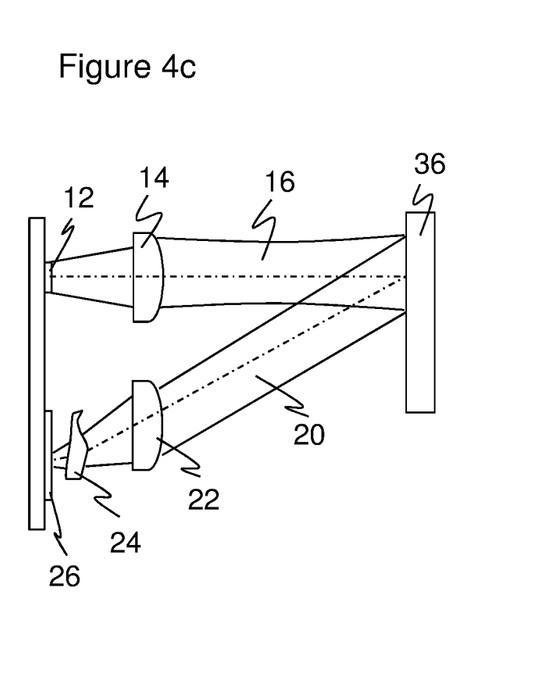
FIG. 4c an exemplary beam path similar to FIG. 4a, but in a sensor according to the invention with an optical element between transmission optics and light receiver.
Figure 4D:
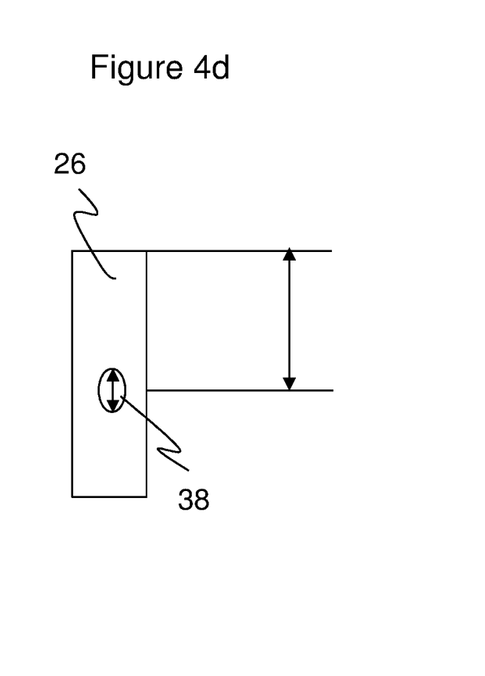
FIG. 4d a schematic representation of the reception light spot on the light receiver in the situation of FIG. 4c.
Figure 5A:
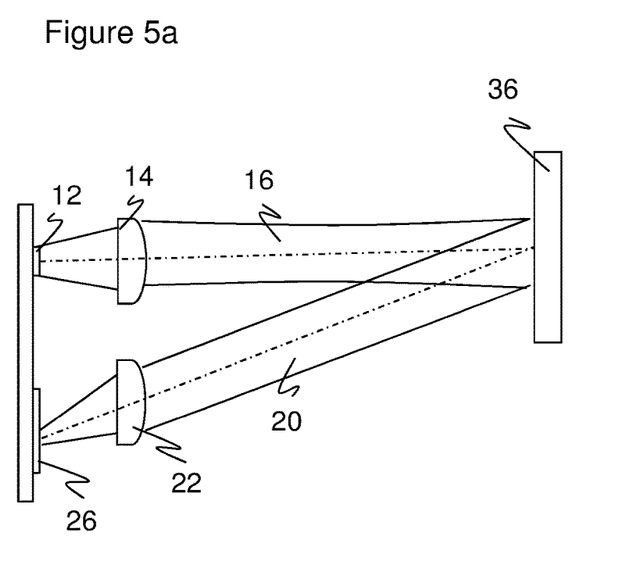
FIGS. 5a-d representations similar to FIGS. 4a-d, but with an object in an intermediate distance range.
Figure 5B:
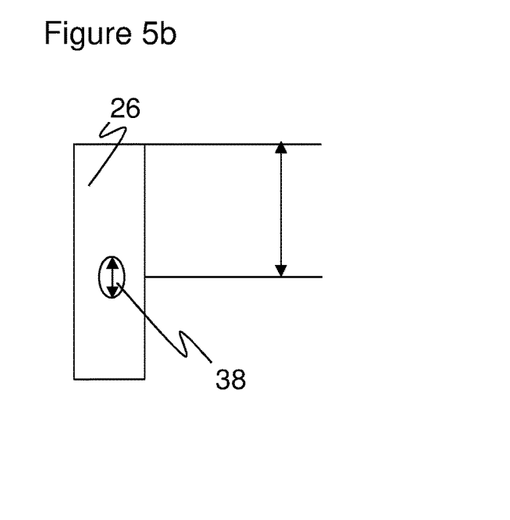
Figure 5C:
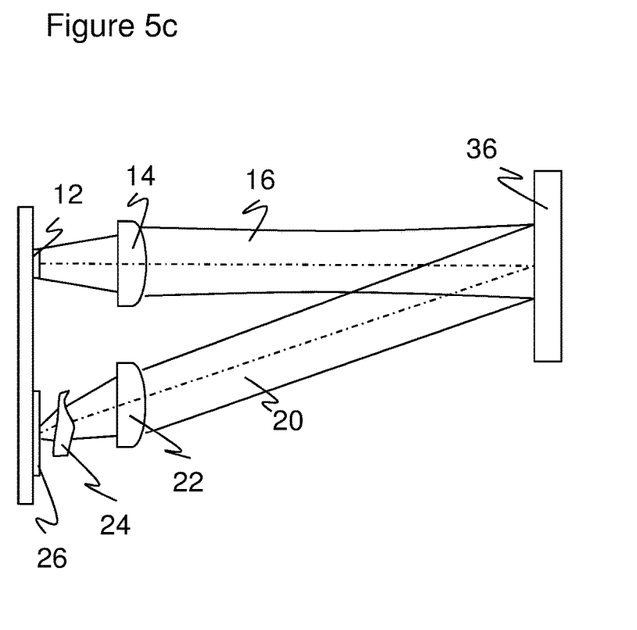
Figure 5D:
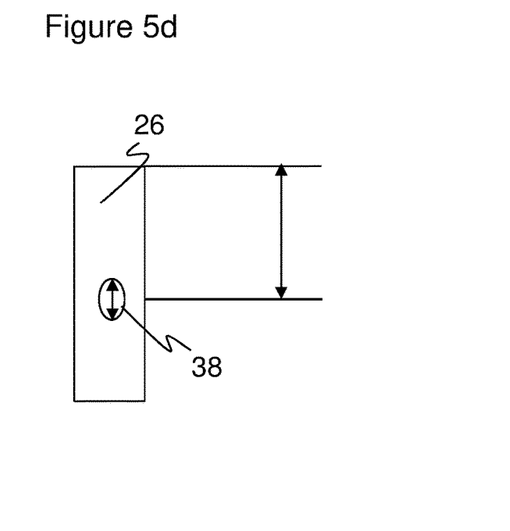
Figure 6A:
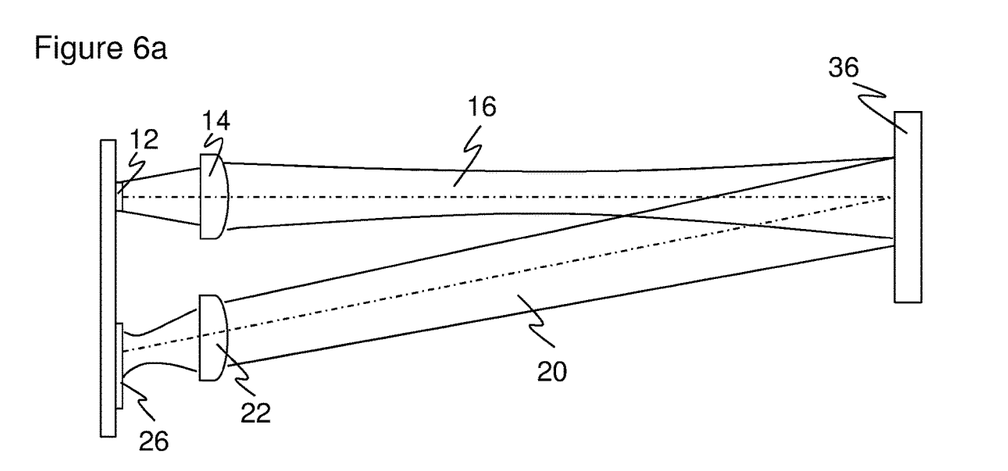
FIGS. 6a-d representations similar to FIGS. 4a-d, but with an object in a far range.
Figure 6B:
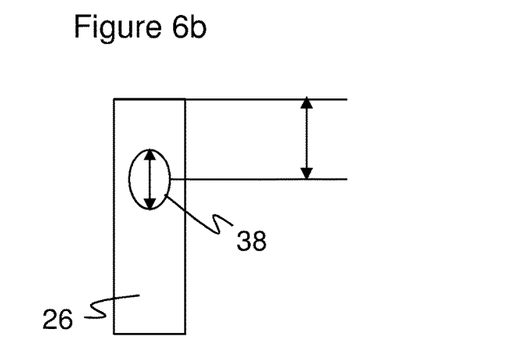
Figure 6C:
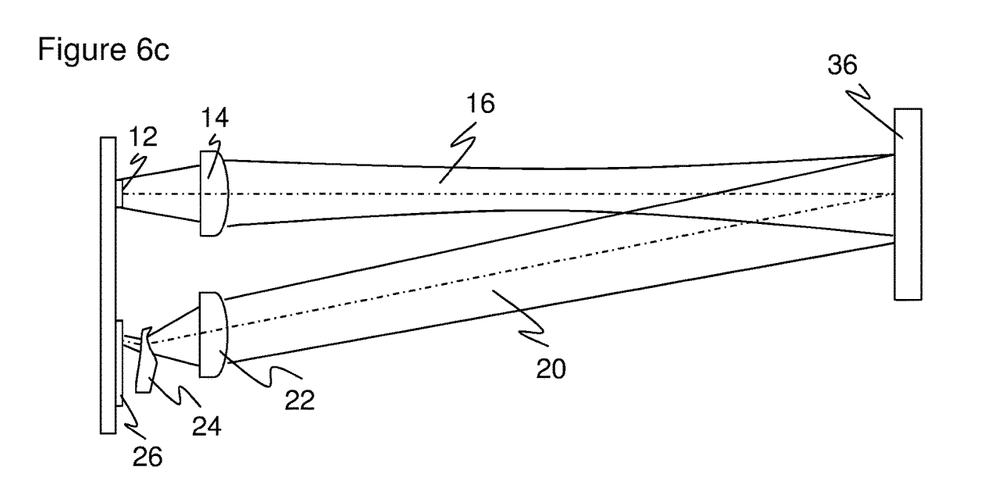
Figure 6D:
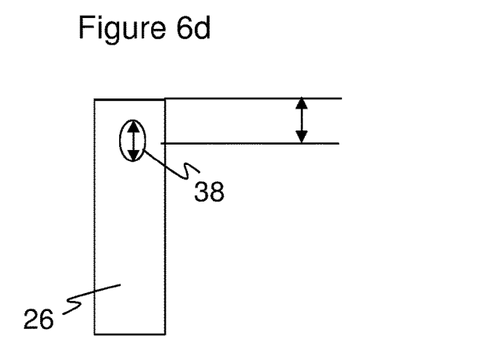

FIG. 2 shows the optical element 24 in a three-dimensional view, while FIG. 3 shows an enlarged view of an exemplary arrangement of the optical element 24 between the receiving optics 22 and the light receiver 26, i.e. in the convergent beam path of the remitted light bundle 20 after being focused by the receiving optics 22. The optical element 24 in this preferred example is a free-form lens, based on refraction. Alternatively, a reflexive effect, e.g. a mirror with a corresponding contour, or a diffractive optical element is possible.

The optical element 24 has a front surface 34a and a rear surface 34b, both of which are formed as free-form surfaces. It would also be conceivable to form one of the surfaces 34ab with a plan or a simple convex or concave contour, which, however, reduces the degrees of freedom of the optimization. In the Y-direction in which light transmitter 12 and light receiver 26 are offset from one another and in which the reception light spot moves as a function of the object distance, the optical element 24 shows a wave-like contour. This results in a converging partial region 24a and, with a transition region 24b, a diverging partial region 24c. The wave-like contour is more pronounced on the front surface 34a than on the rear surface 34b. This leads to a bulging overall shape. The partial regions 24 a-c merge into one another without a clear boundary. It is also conceivable to divide the optical element 24 into two elements for the short range and the long range. One of the two elements could then even be dispensed with, the obvious consequence being that no additional advantageous beam shaping takes place in the corresponding distance range.

In the transverse or X-direction, the optical element 24 is, as a first approximation, an extrusion body in which the wave-like contour repeats itself in each section. This is, however, only the basic shape, which is further optimized with regard to the desired beam shaping effect which will be explained below. For example, light bundles incident obliquely to the axes must be taken into account in three-dimensional space. In addition, it may be advantageous to provide a converging contour in the X-direction as a whole in order to concentrate the remitted light bundle 20 in this axis.

The optical element 24 is trimmed at its sides. This results in a rectangular or trapezoidal frame or a generally parallelepipedal shape. It has little effect on the beam shaping characteristics but simplifies the handling, accommodation and mounting.

The illustrated shape of the optical element 24 is the result of an optimization whose aim is that in both the Y-direction and the X direction a focusing or defocusing with an effective concentration and/or intermixing of partial pupil bundles is achieved, depending on the impact cross section and the point of incidence of the remitted light bundle 20 on the optical element 24, and thus ultimately on the object distance. The effect in the Y-direction and the X-direction will generally be different. Furthermore, a prismatic tilting of the central beams in the direction of the surface normal of the light receiver 26 in dependence on the object distance is also to be achieved. These effects and their advantages will now be explained with reference to FIGS. 4 to 9.

The same optimization goals may also lead to a deviating shape of the optical element 24. The converging partial region 24a and the diverging partial region 24c will result in any optimization. However, the detailed shaping is not limited to the illustrated optical element 24.

FIGS. 4 to 6 illustrate the improved beam pattern at the optical element 24 in a near, intermediate and far range, i.e. a detected object 36 at the corresponding distance. FIG. 4a, 5a or 6a, show the respective beam pattern in a conventional sensor without the optical element 24 as a reference, and FIGS. 4c, 5c, 6c show the respective beam pattern in a sensor 10 according to the invention. The other FIGS. 4b, 5b, 6b and 4d, 5d, 6d show the respective associated reception light spot 38 on the light receiver 26.

In this example, the reception optics 22 is a single converging reception lens focused so that the object 36 in an intermediate distance range is sharply imaged on the light receiver 26. For smaller and larger distances, however, the image is out of focus, and thus the energy distribution of the reception light spot 38 on the light receiver 26 is less concentrated. The variation in position of the reception light spot 38 on the light receiver 26 per distance range variation is large in the near range and small in the far range. Here, one possibility to determine the position of the reception light spot 38 is the un-weighted center of gravity or also the median of the energy distribution of the reception light spot 38.

Now, an effect of the optical element 24 is an energy concentration at least in the near range and the far range as well as a deflection of the position of the median of the receiving light spot 38 from the respective central beam, namely, towards the central beam in the near range and away from the central beam in the far range.

In the near range, which is illustrated in FIG. 4, the incident remitted light bundle 20 is additionally focused by the convex lens surface of the converging partial region 24a, and the energy is thus concentrated on light receiver 26. Without the effect of the converging partial region 24a, the image of the object 36 would be positioned behind the light receiver 26, and accordingly, the energy of the receiving light spot 38 would be less concentrated on the light receiver 26. In addition, the reception light spot 38 is clearly prismatically tilted upwards.

In an intermediate range, which is illustrated in FIG. 5, the incident reflected light bundle 20 remains largely unaffected by the optical element 24, and as a result the position and shape of the reception light spot 28 already focused by the reception optics 22 is largely retained. Such a remitted light bundle 20 is primarily incident on the neutral transition region 24b of the optical element 24.

In the far range, which is illustrated in FIG. 6, the incident reflected light beam is defocused by the concave lens surface of the diverging partial region 24c. This also leads to a concentration of the energy on the light receiver 26 because, without the effect of the diverging partial region 24c, the image of the object 36 would be in front of the light receiver 26 and, accordingly, the reception light spot 38 would be less concentrated. The upwards prismatic tilting of the reception light spot 38 is significantly less pronounced in the far range as compared to the near region.

Figure 7A:
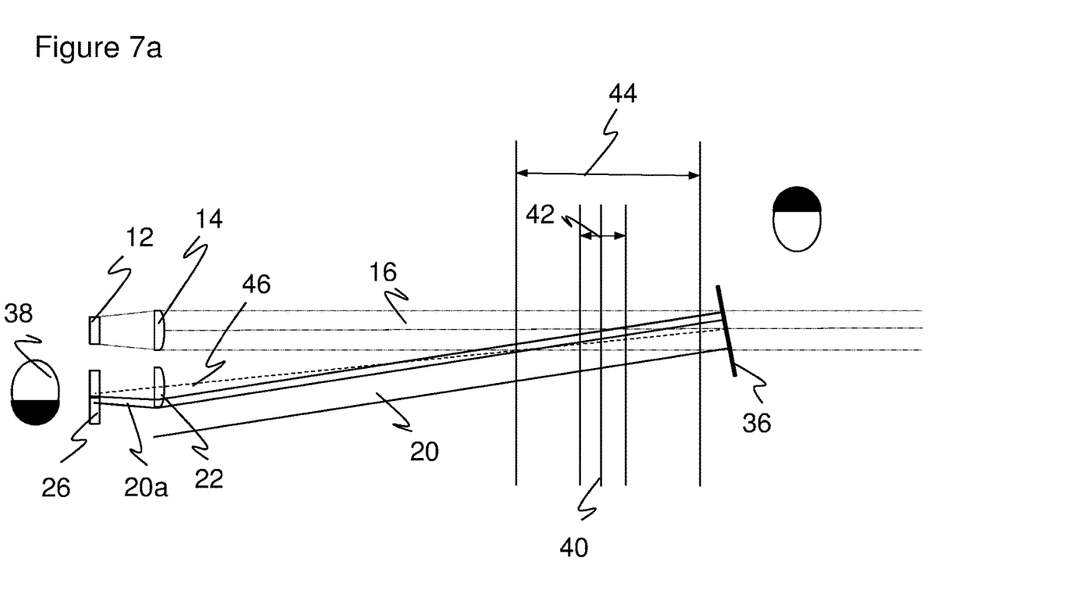
FIG. 7a a schematic representation of the beam path on detection of a glossy object with partial pupil illumination which leads to a faulty switching.
Figure 7B:
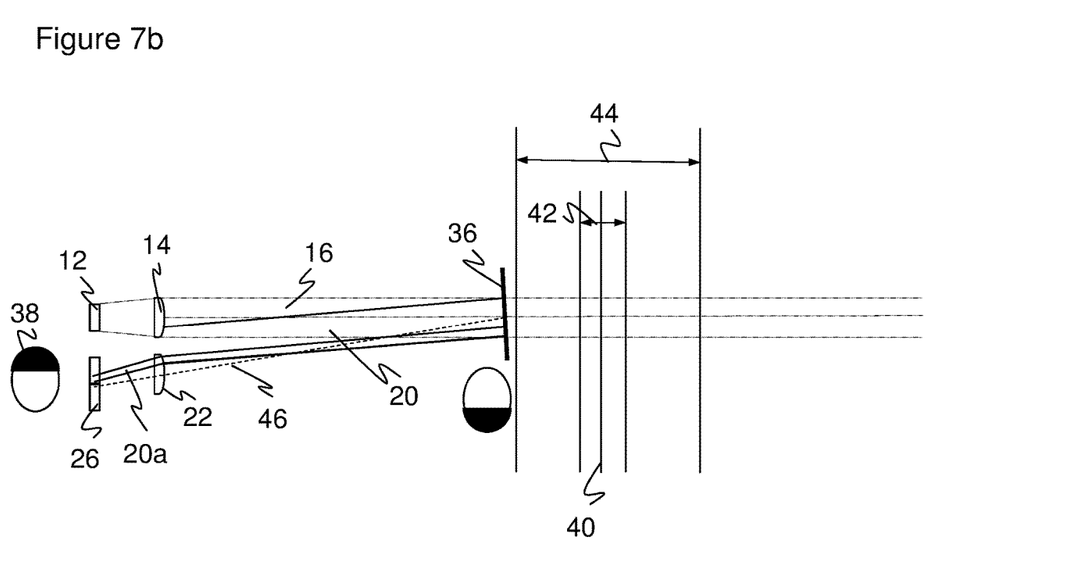
FIG. 7b a representation similar to FIG. 7a but with a nearer glossy object, which is now erroneously overlooked.

Thus, two effects of the optical element 24 have been explained: It strongly contributes to the fact that the distance dependence of the light spot size as well as the non-linearity of the offset of the reception light spot 38 per distance change is significantly reduced. A further problem of sensors according to the principle of triangulation is partial pupil illumination in the detection of glossy objects 36. This is illustrated with reference to FIG. 7.

A background suppressing sensor divides the monitoring area 18 into a foreground in which detection of an object 36 should cause a switching, and a background to be suppressed. The boundary 40 between foreground and background corresponds to the separating element 32. In practice this boundary 40 is evaluated with a switching hysteresis, as indicated by the hysteresis area 42. This prevents a rapid on and off switching due to fluctuations in the measurement of an object 36 near the boundary 40.

In these sensors, there is also a so-called black-white-shift. This means an apparent distance change due to the remission properties of objects 36. A weakly remitting object 36 causes a reception signal above or below the threshold, respectively, in a different distance than a strongly remitting or even specular or glossy object 36. As long as the reflective properties of the objects 36 to be detected are unknown, this leads to a measurement inaccuracy. This is taken into account by a further tolerance interval 44.

However, a glossy object 36 can lead to a faulty switching even outside the hysteresis region 42 and the tolerance interval 44 because, under certain circumstances, only a part of the receiver pupil is illuminated and this results in a considerable deviation of the distance determination.

A glossy object 36 does not remit light in accordance with a Lambert characteristic into all spatial directions, but rather significantly prefers certain directions in the remission which depend on the orientation of the glossy or reflecting surface of the object 36. The receiver pupil is only partly illuminated, for example in the upper, lower, right or left lens half or in even smaller sections. In case the object 36 is not located in the focus range of the receiving optics 22, i.e. the intermediate range, the image of the object 36 is blurred without the optical element 24. Depending on which part of the receiver pupil is illuminated, there results a different median position on the light receiver 26, and thus an error in the distance determination.

FIG. 7 shows a faulty switching for a glossy object 36 which is too far and therefore should be suppressed. A partial bundle 20a of the remitted light bundle 20 illuminates only a lower part of the reception optics 22. Accordingly, much energy is incident on the near range element 26a, and the sensor 10 switches on. In contrast, the ideal central beam 46 would be incident on the far range element 26b and thus correctly suppressed.

FIG. 7b shows a corresponding fault case with a near glossy object 36, which is erroneously overlooked. In this constellation, a partial beam 20a of the remitted light bundle 20 illuminates only the upper part of the receiving optics 22, and thus much energy is incident on the far range element 26b, which causes a false background suppression. In contrast, the ideal central beam 46 would be incident on the near range element 26a and the sensor 10 would switch on.

FIG. 8 once again shows the effects of partial pupil illumination without the optical element 24. Different partial beams, which impinge on the receiving optics 22 at different heights, result, with insufficient focusing, in reception light spots with corresponding strip-shaped increased energy densities such that the effective median position and thus the measured object distance is shifted as compared to a homogeneously illuminated receiver pupil.

Figure 8:
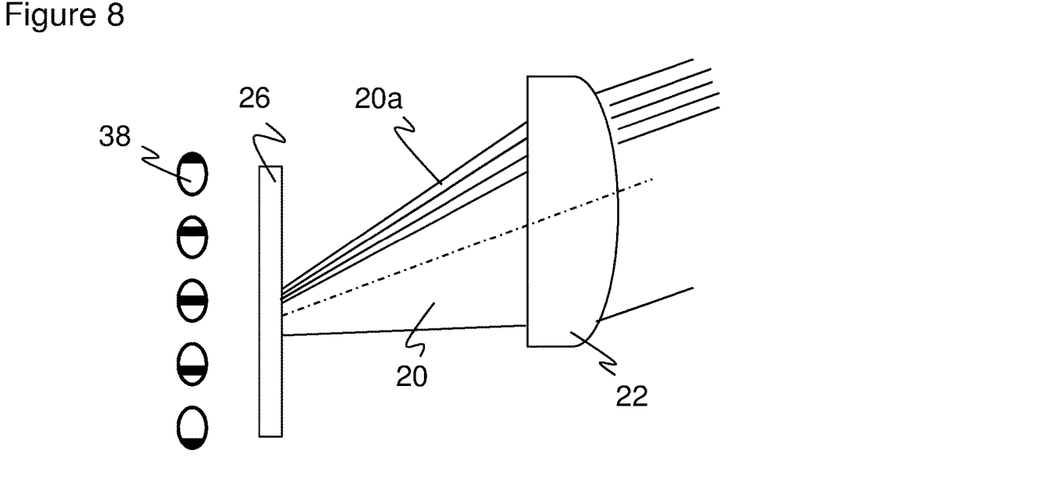
FIG. 8 a representation of partial beam bundles of the remitted light bundle and the resulting partial pupil illumination.

The optical element 24 also minimizes these undesired effects of partial pupil illumination, without affecting the other sensor performance, since the receiving light spot 38 is also much more focused in the near range and the far range. As a result, the median shift has significantly less impact on the measurement.

Figure 9:
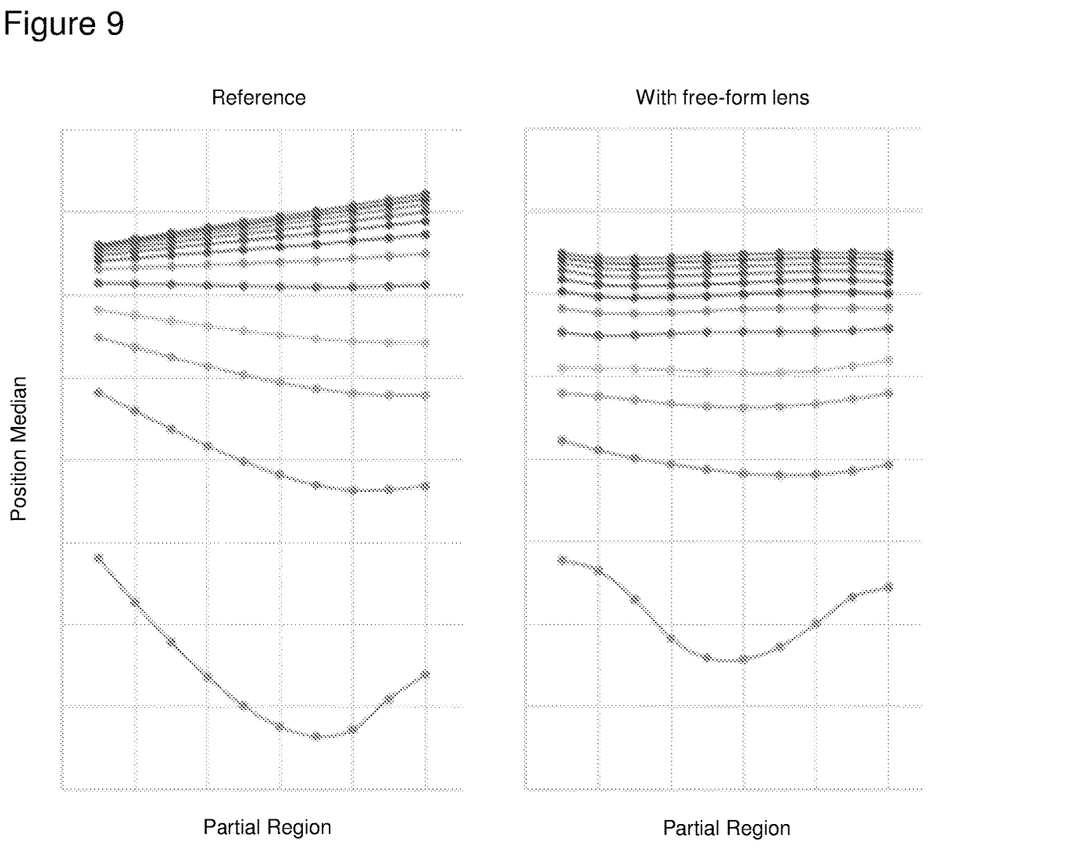
FIG. 9 a comparison of the light spot position for different partial pupil illuminations in a reference case without the optical element and according to the invention with the optical element.

This improvement by the optical element 24 for partial pupil illumination is systematically illustrated in FIG. 9. In a simulation, the receiving optics 22 are respectively illuminated by only one of ten strips arranged one above the other similar to the illustration in FIG. 8. These strips or partial regions are plotted on the X-axis. The Y-axis represents the respective median position, each with a respective curve for different distances. FIG. 9 shows a reference without the optical element 24 on the left, while the improvement according to the invention is shown on the right.

The ideal situation would be if all the curves were parallel to the X-axis. This would mean that the median position is entirely independent of which part of the receiver pupil is illuminated. The position of the respective curve on the Y-axis would be determined solely by the distance. This is by no means the case in the reference on the left-hand side, which is merely a summary of the problems already explained with reference to FIG. 7.

According to the invention, the curves run at least largely horizontally, as can be seen on the right in FIG. 9. Hence, by the use of the optical element 24, the switching behavior is significantly more robust against partial illuminations of the receiver pupil, as occur primarily in the detection of glossy objects 36, and the accuracy of measuring the distance becomes much more accurate.

In conclusion, due to the distance-dependent beam-shaping by the optical element 24, there is an effective homogenization of the partial pupil sensitivity, improvements in the triangulating energy density and at least some compression and linearization of the triangulation curve, i.e. the position of the median of the reception light spot 38 in dependence on the detection range or the object distance. This results in a reduced distance dependence of the sensor 10 with respect to remission properties of the objects and a simplification and an improvement of the useful detection range setting for the user.

In comparisons with references similar to FIG. 9, further characteristics of a sensor 10 according to the principle of triangulation can be investigated. This is, on the one hand, the median which has already been mentioned, i.e. the median position of the energy distribution in the Y-direction or triangulation direction. Triangulation dynamics denotes the differential change of the median in the Y-direction as a function of the detection range, and energy density denotes the local energy density on the light receiver 26 in the median. Finally, the triangulating energy density is the product of triangulation dynamics and energy density. All these properties are improved at least in the far range. A possible small loss in the near range is thus overcompensated, where there are anyway large reserves.

In a sensor 10 according to the principle of triangulation, the discrimination of the foreground against the background strongly depends on the triangulating energy density, which should therefore be as large as possible. The setting range is determined by the distance between the maximum and minimum position of the median, which therefore should be compressed as much as possible. Finally, the setting precision depends on the linearity of the triangulation dynamics. All three effects are improved by the optical element 24 in a wide range.

In addition to the beam-shaping properties as described, the optical element 24 can also be used as an optical filter. If the remitted light bundle 20 is attenuated in the near range, i.e. by the converging partial region 24a, by means of roughening, mirroring, absorbing or the like, the total energy can be reduced in the near range and thus the energetic distance characteristic can be adapted. This reduces the required dynamics range of evaluation circuits downstream the light receiver 26, with the advantages of lower costs, heat and noise.

Other additional functions may also be integrated into the optical element 24. As a transparent functional component, a free-form lens can in principle be manufactured from plastics or glass and thus be combined with functional surface or volumetric properties of this material, or with additionally applied layers. Examples are spectral filtering, spatial filtering, whether homogeneous, inhomogeneous or structured, volume or surface scattering, fluorescence or luminescence, polarization filtering for example by means of wire-grid polarizer layers, and diffractive-optical properties.

The invention claimed is:

1. An optoelectronic sensor (10) according to the principle of triangulation for detecting an object (36) in a monitoring region (18), the sensor (10) comprising a light transmitter (12) for transmitting a light bundle (16) and a spatially resolving light receiver (26) offset from the light transmitter (12) by a base distance for receiving a remitted light bundle (20) remitted by the object (36), wherein receiving optics (22) and an optical element (24) are arranged in front of the spatially resolving light receiver (26), and wherein the optical element (24) comprises a converging partial region (24a) and a diverging partial region (24c) and is arranged such that, in detecting the object by triangulation, the remitted light bundle (20) from an object (36) in a near range of the monitoring region (18) passes through the converging partial region (24a) and a remitted light bundle (20) from the object (36) in a far range of the monitoring region (18) passes through the diverging partial region (24c).

2. The sensor (10) according to claim 1, wherein the optical element (24) comprises a neutral partial region (24b) between the converging partial region (24a) and the diverging partial region (24c).

3. The sensor (10) according to claim 1, wherein the optical element (24) additionally causes a prismatic tilting of remitted light (20).

4. An optoelectronic sensor (10) according to the principle of triangulation for detecting an object (36) in a monitoring region (18), the sensor (10) comprising a light transmitter (12) for transmitting a light bundle (16) and a spatially resolving light receiver (26) offset from the light transmitter (12) by a base distance for receiving a remitted light bundle (20) remitted by the object (36), wherein receiving optics (22) and an optical element (24) between light receiver (26) and receiving optics (22) are arranged in front of the spatially resolving light receiver (26), wherein the optical element (24) comprises a converging partial region (24a) and a diverging partial region (24c) and is arranged such that, in detecting the object by triangulation, the remitted light bundle (20) from an object (36) in a near range of the monitoring region (18) passes through the converging partial region (24a) and a remitted light bundle (20) from the object (36) in a far range of the monitoring region (18) passes through the diverging partial region (24c), wherein the optical element (24) comprises a free-form surface (34a-b) comprising the converging partial region (24a) and the diverging partial region (24c), wherein, in a section along the base distance, the optical element (24) has the basic shape of a wave, the optical element (24) additionally comprises a converging curvature transverse to the wave, and wherein the free-form surface (34a-b) has at least one of localized curvatures or localized gradients of curvature both in a direction in which, in said detecting the object by triangulation, a reception light spot moves on the light receiver (26) and in a direction perpendicular thereto, and thus at least one of concentrates or mixes partial pupil bundles (20a) of the remitted light bundle (20).

5. The sensor (10) according to claim 4, wherein the optical element (24) comprises a free-form surface (34a-b) comprising the converging partial region (24a) and the diverging partial region (24c).

6. The sensor (10) according to claim 5, wherein the free-form surface (34a-b) has at least one of localized curvatures or localized gradients of curvature and thus at least one of concentrates or mixes partial pupil bundles (20a) of the remitted light bundle (20).

7. The sensor (10) according to claim 5, wherein, in a section along the base distance, the optical element (24) has a basic shape of a single contiguous wave.

8. The sensor (10) according to claim 7,
wherein the optical element (24) has a shape of a body transversely extruded from the wave.

9. The sensor (10) according to claim 7,
wherein the optical element (24) additionally comprises a converging curvature transverse to the wave.

10. The sensor (10) according to claim 7,
wherein the free-form surface (34a-b) is further optimized from the basic shape in order to take oblique incident light bundles into account.

11. The sensor (10) according to claim 4,
wherein the optical element (24) is trimmed into a rectangular or trapezoidal frame.

12. The sensor (10) according to claim 4,
wherein the diverging partial region (24c) has attenuating properties for the remitted light bundle (20).

13. The sensor (10) according to claim 4,
wherein the optical element (24) is also configured as an optical filter.

14. The sensor (10) according to claim 4, the sensor (10) being configured as a background suppressing sensor,
wherein the spatially resolving light receiver (26) comprises a near region (26a) and a far region (26b) with a separating element (32) therebetween, and having a switching output (30) whose switching state depends on whether an object (36) is detected in the near range.

15. The sensor (10) according to claim 4,
wherein the optical element (24) comprises a neutral partial region (24b) between the converging partial region (24a) and the diverging partial region (24c).

16. The sensor (10) according to claim 4,
wherein the free-form surface (34a-b) is further optimized from the basic shape in order to take oblique incident light bundles into account.

17. The sensor (10) according to claim 4,
wherein the optical element (24) additionally causes a prismatic tilting of remitted light (20).

18. A method for detecting an object (36) in a monitoring region (18) according to the principle of triangulation for detecting an object (36) in a monitoring region (18), the sensor (10), the method comprising:

transmitting a light bundle (16);
receive receiving a remitted light bundle (20) remitted by the object (36) using a spatially resolving light receiver (26) offset from the light transmitter (12) by a base distance to transmit a light bundle (16); and
determining a receiving position of the light bundle (20) remitted from the object (36),
wherein receiving optics (22) and an optical element (24) between light receiver (26) and receiving optics (22) are arranged in front of the spatially resolving light receiver (26),
wherein, in detecting the object by triangulation, the remitted light bundle (20) is focused by a receiving optics and then additionally beam-shaped in an optical element (24),
wherein the optical element (24) comprises a free-form surface (34a-b) comprising the converging partial region (24a) and the diverging partial region (24c),
wherein, in a section along the base distance, the optical element (24) has the basic shape of a wave, the optical element (24) additionally comprises a converging curvature transverse to the wave,
wherein the free-form surface (34a-b) has at least one of localized curvatures or localized gradients of curvature both in a direction in which, in said detecting the object by triangulation, a reception light spot moves on the light receiver (26) and a direction perpendicular thereto, and thus at least one of concentrates or mixes partial pupil bundles (20a) of the remitted light bundle (20),
and wherein the optical element (24) comprises a converging partial region (24a) and a diverging partial region (24c) and is arranged such that, in detecting the object by triangulation, the remitted light bundle (20) from an object (36) in a near range of the monitoring region (18) passes through the converging partial region (24a) of the optical element (24) and a light bundle (20) remitted by an object (36) in a far range of the monitored region (18) is beam-shaped in a diverging partial region (24c) of the optical element (24).

* * * * *